United States Patent
Baxes

(10) Patent No.: US 7,680,350 B2
(45) Date of Patent: Mar. 16, 2010

(54) METHOD AND SYSTEM FOR PROGRESSIVE MESH STORAGE AND RECONSTRUCTION USING WAVELET-ENCODED HEIGHT FIELDS

(75) Inventor: Gregory A. Baxes, Littleton, CO (US)

(73) Assignee: TerraMetrics, Inc., Littleton, CO (US)

( * ) Notice: Subject to any disclaimer, the term of this patent is extended or adjusted under 35 U.S.C. 154(b) by 1191 days.

(21) Appl. No.: 11/124,793

(22) Filed: May 9, 2005

(65) Prior Publication Data

US 2010/0013829 A1 Jan. 21, 2010

Related U.S. Application Data

(60) Provisional application No. 60/569,332, filed on May 7, 2004.

(51) Int. Cl.
*G06K 9/46* (2006.01)
*G06T 15/00* (2006.01)
(52) U.S. Cl. .................. 382/248; 345/419
(58) Field of Classification Search .......... 382/248, 382/249, 250; 345/419–427
See application file for complete search history.

(56) References Cited

U.S. PATENT DOCUMENTS

| | | | | |
|---|---|---|---|---|
| 5,831,625 | A * | 11/1998 | Rich et al. | 345/587 |
| 6,104,842 | A * | 8/2000 | Rich | 382/304 |
| 6,426,750 | B1 * | 7/2002 | Hoppe | 345/428 |
| 6,438,266 | B1 * | 8/2002 | Bajaj et al. | 382/243 |
| 6,640,015 | B1 * | 10/2003 | Lafruit et al. | 382/260 |
| 6,879,324 | B1 * | 4/2005 | Hoppe | 345/423 |
| 6,985,903 | B2 * | 1/2006 | Biacs | 707/100 |
| 7,006,088 | B1 * | 2/2006 | Guskov et al. | 345/420 |
| 7,280,109 | B2 * | 10/2007 | Hoppe | 345/423 |
| 7,283,134 | B2 * | 10/2007 | Hoppe | 345/423 |
| 7,362,903 | B2 * | 4/2008 | Gioia | 382/232 |
| 7,538,769 | B2 * | 5/2009 | Hoppe | 345/428 |
| 2003/0034970 | A1 * | 2/2003 | Hubeli et al. | 345/420 |
| 2003/0053685 | A1 * | 3/2003 | Lestideau | 382/164 |
| 2003/0108248 | A1 * | 6/2003 | Huang et al. | 382/240 |

(Continued)

OTHER PUBLICATIONS

Gross, Mrkus H.;Staadt, Oliver G.; Gatti, Roger; Efficient Triangular Surface Approximations Using Wavelets and Quadtree Data Structures; Jun. 1996; IEEE Transactions on Visualization and Computer Graphics; vol. 2, No. 2; pp. 130-143.*

Berman et al., "Multiresolution Painting and Compositing", Jul. 1994, Dept. of Computer Science and Engineering, Univ. of Washington, pp. 85-90.*

(Continued)

*Primary Examiner*—Aaron W Carter
(74) *Attorney, Agent, or Firm*—Lathrop & Gage LLP

(57) ABSTRACT

Systems and methods are provided for progressive mesh storage and reconstruction using wavelet-encoded height fields. A method for progressive mesh storage includes reading raster height field data, and processing the raster height field data with a discrete wavelet transform to generate wavelet-encoded height fields. In another embodiment, a method for progressive mesh storage includes reading texture map data, and processing the texture map data with a discrete wavelet transform to generate wavelet-encoded texture map fields. A method for reconstructing a progressive mesh from wavelet-encoded height field data includes determining terrain blocks, and a level of detail required for each terrain block, based upon a viewpoint. Triangle strip constructs are generated from vertices of the terrain blocks, and an image is rendered utilizing the triangle strip constructs. Software products that implement these methods are provided.

14 Claims, 14 Drawing Sheets

U.S. PATENT DOCUMENTS

2003/0231798 A1* 12/2003 Jang ........................... 382/240
2004/0085315 A1* 5/2004 Duan et al. .................. 345/428
2005/0099420 A1* 5/2005 Hoppe ........................ 345/420
2005/0116949 A1* 6/2005 Hoppe ........................ 345/423
2005/0116950 A1* 6/2005 Hoppe ........................ 345/423

OTHER PUBLICATIONS

Lee, "Wavelet-Based Multiresolution Surface Approximation from Height Fields", Feb. 2002, Virginia Polytechnic Institute and State University.*

* cited by examiner

METHOD AND SYSTEM FOR PROGRESSIVE MESH STORAGE AND RECONSTRUCTION USING WAVELET-ENCODED HEIGHT FIELDS

CROSS-REFERENCE TO RELATED APPLICATIONS

This application claims the benefit of priority to U.S. Provisional Patent Application No. 60/569,332, filed 7 May 2004 and incorporated herein by reference.

U.S. GOVERNMENT RIGHTS

This invention was made with Government support under contracts NAS5-01196 and NNL04AC32P awarded by NASA. The Government has certain rights in this invention.

BACKGROUND

The following patents provide useful background information and are incorporated herein by reference: U.S. Pat. No. 6,426,750; U.S. Pat. No. 6,208,997; U.S. Pat. No. 5,929,860; and U.S. Pat. No. 5,831,625.

Other useful background information includes the following articles: "Fast Terrain Rendering Using Geometrical Mip-Mapping" by de Boer, W. H. (2000); "Compression of Digital Elevation Maps Using Nonlinear Wavelets" by Creusere, C. D. (2000); "Efficient Triangular Surface Approximations Using Wavelets and Quadtree Data Structures" by Gross, M. H., Staadt, O. G., and Gatti, R. (1996); "Adaptive Surface Meshing and Multi-Resolution Terrain Depiction for SVS" by Wiesemann, T., Schiefele, J., Kubbat, W., Proceedings SPIE Vol. 4363 Enhanced and Synthetic Vision (August 2001); "Multi-Resolution Terrain Depiction and Airport Navigation Function on an Embedded SVS" by Wiesemann, T., Schiefele, J., Bader, J., Proceedings SPIE Vol. 4713 Enhanced and Synthetic Vision (July 2002); "Wavelet Analysis for a New Multiresolution Model for Large-Scale Textured Terrains" by Abasolo, M. J., Perales, F. J., Journal of WSCG, (2003); "Multiresolution Surface and Volume Representations" by Staadt, O. G., Geometric modeling for Scientific Visualization, Springer-Verlag, Heidelberg, Germany, (2003); "Generation of Hierarchical Multiresolution terrain Databases Using Wavelet Filtering" by McArthur, D. E., Fuentes, R. W., Devarajan, V., Photogrammetric Engineering & Remote Sensing (2000); "Compression Methods for Visualization" by Gross, M. H., Lippert, L., Staadt, O. G., Future Generation Computer Systems, Vol. 15, No. 1 (1999); "Multiresolution Compression and Reconstruction", by Staadt, O. G., Gross, M. H., Weber, R., Proceedings of IEEE Visualization '97 (1997); "Fast Multiresolution Surface Meshing" by Gross, M. H., Gatti, R., Staadt, O. G., 6th IEEE Visualization Conference (1995).

SUMMARY

A method and system are provided for progressive mesh storage and reconstruction using wavelet-encoded height fields. A system so constructed may provide for full-mesh storage of terrain elevation height field datasets, such as Digital Terrain Elevation Data ("DTED"), using wavelet-encoded terrain height fields. The system may then retrieve, prepare and render spatially-filtered, smoothly-continuous, level-of-detail 3D terrain geometry.

In one embodiment, a method for progressive mesh storage includes reading raster height field data, and processing the raster height field data with a discrete wavelet transform to generate wavelet-encoded height fields. Processing may include processing the raster height field data into a quadtree structure, and/or may include utilizing a wavelet subband filter that may be one of the integer biorthogonal 5/3 Daubechies form and the biorthogonal 9/7 Daubechies form.

In another embodiment, a method for progressive mesh storage includes reading texture map data, and processing the texture map data with a discrete wavelet transform to generate wavelet-encoded texture map fields. Processing may include processing the texture map data into a quadtree structure, and/or may include utilizing a wavelet subband filter that may be one of the integer biorthogonal 5/3 Daubechies form and the biorthogonal 9/7 Daubechies form.

In another embodiment, a method for reconstructing a progressive mesh from wavelet-encoded height field data includes determining terrain blocks, and a level of detail required for each terrain block, based upon a viewpoint. Triangle strip constructs are generated from vertices of the terrain blocks, and an image is rendered utilizing the triangle strip constructs. Determining terrain blocks and/or the level of detail required may include (a) evaluating distance of the terrain blocks from the viewpoint, and/or (b) evaluating orientation of the viewpoint with respect to the terrain blocks. The method may include redetermining terrain blocks, and a level of detail required for each terrain block, based upon a change of the viewpoint. The method may include determining and unloading one or more unnecessary terrain blocks, based upon a change of the viewpoint. The method may include evaluating a distance parameter $\alpha$ for each terrain block; and performing a geomorph, utilizing distance parameter $\alpha$, on each terrain block. The method may include determining texture map blocks and a level of detail for each texture map block, wherein the step of rendering comprises utilizing the texture map blocks. The method may include performing an edge-join operation to eliminate T-junctions where terrain blocks of differing levels of detail meet. The image may include ancillary scene data. Each terrain block may be divided into a field region and a trim region, so that vertices of the field region may be transmitted as one triangle strip construct and vertices of the trim region may be transmitted as one or more additional triangle strip constructs. Original height field minima and maxima may be preserved in the wavelet-encoded height fields and the rendered image at all levels of detail.

In another embodiment, a software product includes instructions for progressive mesh storage, including instructions for (a) reading one of raster height field data and texture map data as input data, and for (b) processing the input data with a discrete wavelet transform to generate wavelet-encoded data.

In another embodiment, a software product includes instructions for reconstructing a progressive mesh from wavelet-encoded height field data, including instructions for (a) determining terrain blocks, and a level of detail required for each terrain block, based upon a viewpoint; for (b) generating one or more triangle strip constructs from vertices of the terrain blocks; and for (c) rendering an image utilizing the triangle strip constructs.

DETAILED DESCRIPTION

In certain of the progressive mesh storage and processing systems and methods disclosed herein, particularly in connection with reconstruction using wavelet-encoded height fields for three-dimensional (3D) computer graphics and 3D terrain rendering, two general constructs may be employed. First, regular x, y-matrix terrain height fields and texture data may be processed and stored in wavelet-encoded forms (i.e., a terrain height field matrix and/or texture map data may be processed using a discrete wavelet transform ("DWT") and the resulting data may be retained as source data for a 3D terrain renderer). Second, a terrain block-based 3D terrain renderer (1) manages scene level-of-detail data requirements depending on point of view, (2) reconstructs output from the wavelet-encoded source data, scene requirements and regions of interest (current and/or projected), and optionally (3) processes ancillary scene data to perform a complete 3D rendering of the resulting scene.

Figure 1A:
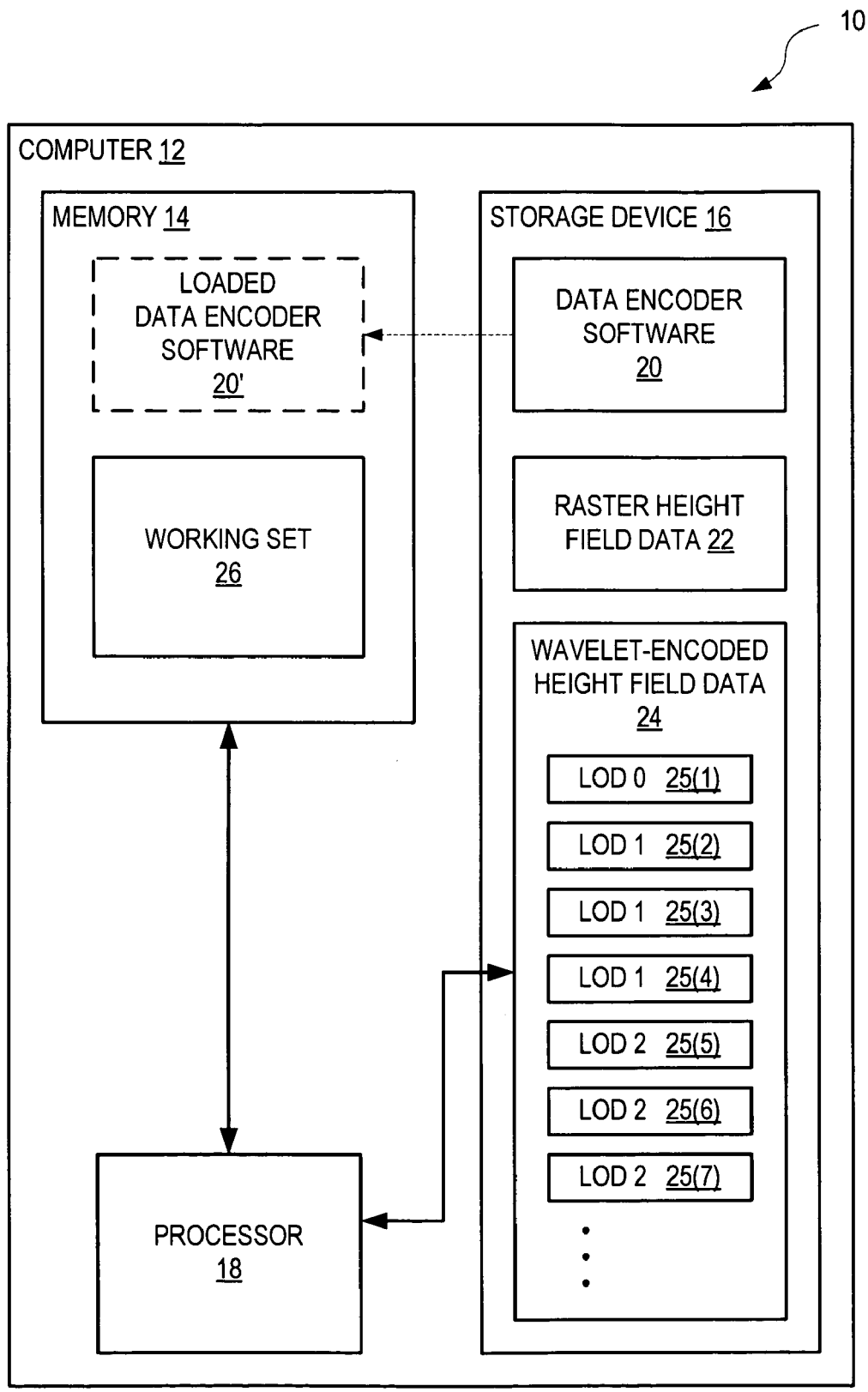
FIG. 1A shows one exemplary system for progressive mesh storage that processes raster height field data into wavelet-encoded height fields.

For example, FIG. 1A shows one exemplary system 10 for progressive mesh storage that processes raster height field data into wavelet-encoded height fields, in accord with an embodiment. System 10 includes a computer 12 that, for example, has a memory 14, a storage device 16 and a processor 18. Storage device 16 is for example a hard disk drive, and can store data encoder software 20, raster height field data 22 and wavelet-encoded height field data 24, as shown. Processor 18 operates to load data encoder software 20 into memory 14, as illustrated by dashed lines of loaded data encoder software 20'. Processor 18 then executes loaded data encoder software 20' to process raster height field data 22, to produce wavelet-encoded height field data 24. A working set 26 that may include part or all of raster height field data 22 may be created in memory 14 during the processing of raster height field data 22. Wavelet-encoded height field data 24 includes terrain blocks at multiple levels of detail ("LOD") that may also be indexed by spatial location (see FIG. 4). For example, FIG. 1A shows wavelet-encoded height field data 24 including an LOD 0 terrain block 25(1), LOD 1 terrain blocks 25(2)-25(4), LOD 2 terrain blocks 25(5)-25(7), and other terrain blocks denoted by ellipsis.

Raster height field data 22 may include multiple files which may cover different geographic areas and which may map different (adjacent or overlapping) areas with differing data densities (i.e., may have different numbers of data points per unit area). For example, areas around airports may be mapped with higher data density than other areas. Data encoder software 20 may process raster height field data 22 that has high data density into wavelet-encoded height field data 24 that has more levels of detail, and raster height field data 22 that has low data density into wavelet-encoded height field data 24 that has fewer levels of detail. Wavelet-encoded height field data 24 at a highest level of detail may include information enabling an exact reconstruction of vertices of raster height field data 22.

Processing of raster height field data 22 into wavelet-encoded height field data 24 may also compress the data. A lossless compression mode, such as provided by the reversible integer biorthogonal 5/3 Daubechies form, typically creates wavelet-encoded height field data that is compressed by about 2:1 to 4:1 as compared to raster height field data. Lossy compression, such as provided by the irreversible biorthogonal 9/7 Daubechies form, may create wavelet-encoded height field data that is compressed by about 10:1 to 50:1 as compared to raster height field data. A compression mode used for a particular application may be chosen by evaluating tradeoffs such as memory size, speed of reconstruction, and tolerance in the application for visual errors that may result from reconstruction of data compressed with a lossy compression mode.

Figure 1B:
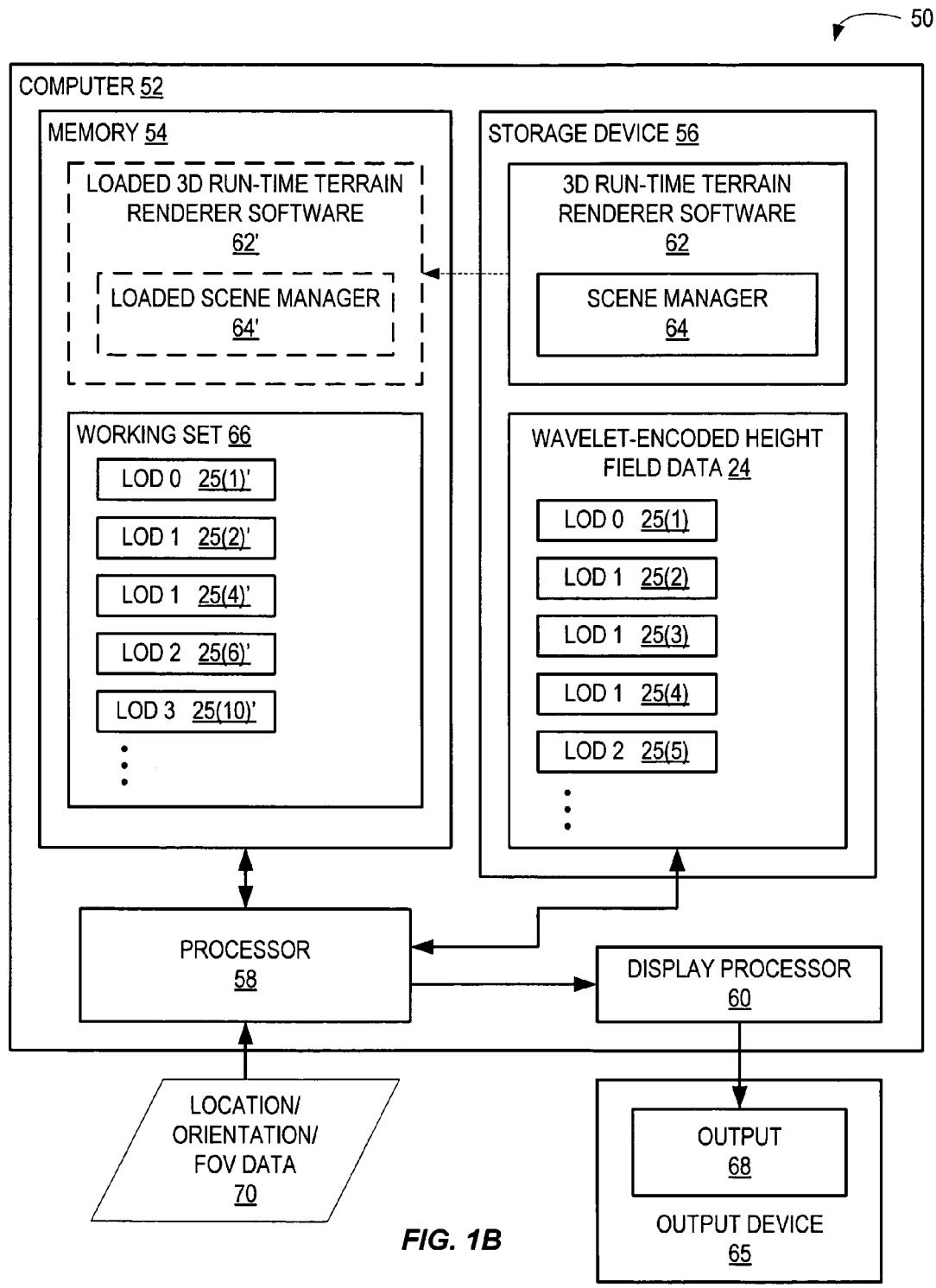
FIG. 1B shows one exemplary system for reconstruction using wavelet-encoded height fields.

FIG. 1B shows one exemplary system 50 for reconstruction using wavelet-encoded height fields, in accord with an embodiment. System 50 includes a computer 52 and an output device 65; location/orientation/field-of-view data 70 is shown being input to computer 52. Computer 52 is additionally shown to include memory 54, a storage device 56, a processor 58 and a display processor 60. Storage device 56 is, for example, a hard disk drive. Storage device 56 is shown with 3D run-time terrain renderer software 62 and wavelet-encoded height field data 24 (which may be created by system 10, FIG. 1A, for example). Wavelet-encoded height field data 24 includes terrain blocks 25. Processor 58 operates to load 3D run-time terrain renderer software 62 into memory 54, as illustrated by dashed lines of loaded 3D run-time terrain renderer software 62'. 3D run-time terrain renderer software 62 contains a scene manager 64 that loads into memory 54 as loaded scene manager 64'. Processor 58 then executes loaded 3D run-time terrain renderer software 62' to process location/orientation/field-of-view data 70, load selected terrain blocks 25 as loaded terrain blocks 25' in a working set 66, and process loaded terrain blocks 25' to produce an output display signal 68 via display processor 60 (where terrain blocks 25 and 25' denote general cases of terrain blocks 25(1), 25(2), . . . and 25(1)', 25(2)', . . . , respectively, as shown in FIG. 1B). Not every terrain block 25 of wavelet-encoded height field data 24 typically loads into working set 66 (e.g., FIG. 1B shows terrain blocks 25(1)', 25(2)', 25(4)', 25(6)', 25(10)', and others denoted by ellipsis, but not terrain blocks 25(3)', 25(5)' or 25(7)'-25(9)', for example). Working set 66 may also contain other kinds of data (see FIG. 2C). Display processor 60 may be, for example, a Graphics Processing Unit ("GPU"). Output 68 may be utilized by an output device 65 that may be, for example, a visual display, a printer, a plotter or a Web client. Location/orientation/field-of-view data 70 may be, for example, (1) received from an aircraft navigation computer, (2) received from a Web client, defining a view desired on output device 65, or (3) received from an input device or devices.

Figure 2A:
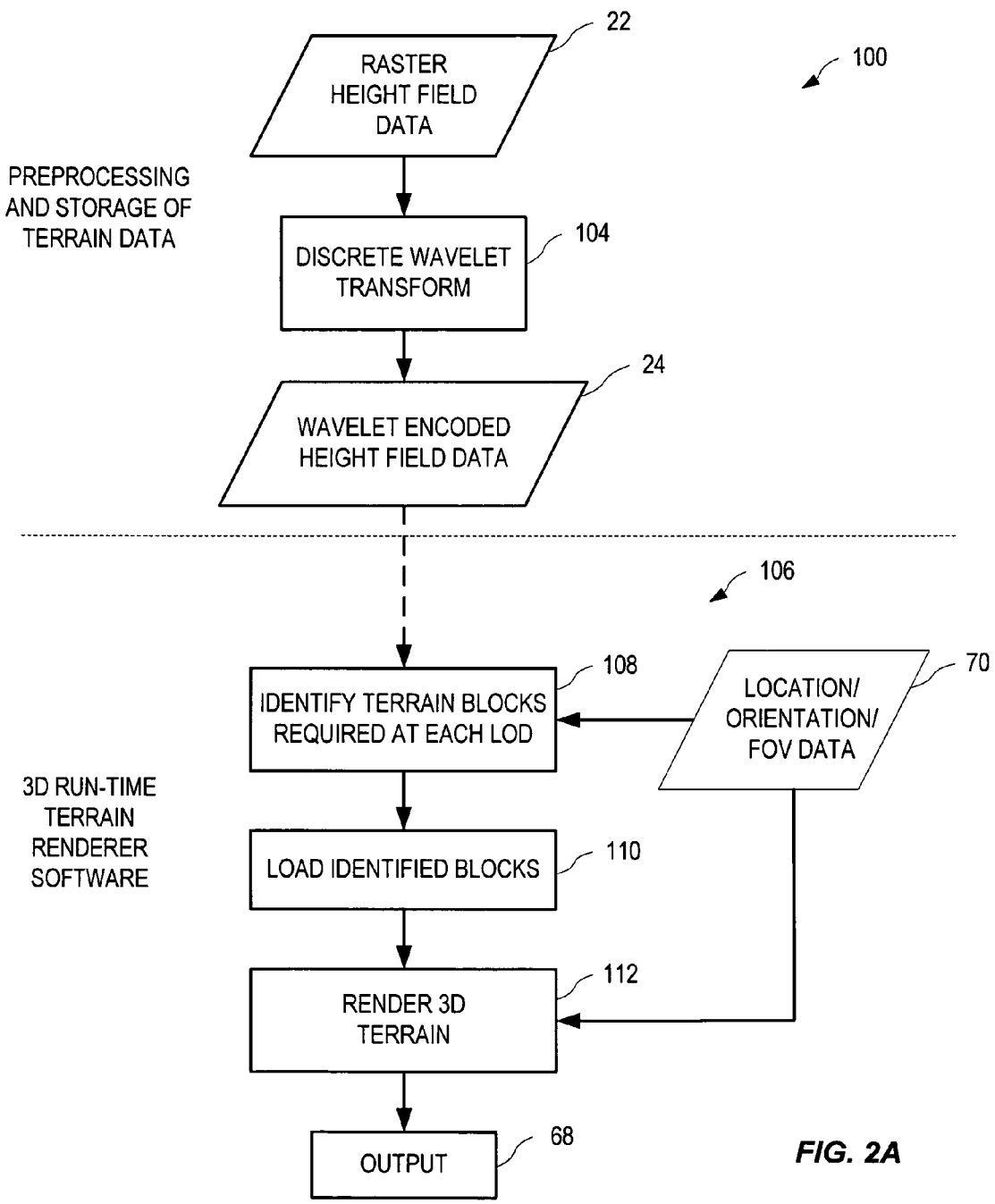
FIG. 2A shows a flowchart illustrating an exemplary process that creates wavelet-encoded height field data from raster height field data, and an exemplary run-time process that uses wavelet-encoded height field data and location/orientation/field-of-view data to produce output.

FIG. 2A shows a flowchart illustrating (1) an exemplary process 100 that creates wavelet-encoded height field data 24 from raster height field data 22 and (2) an exemplary process 106 that uses wavelet-encoded height field data 24 and location/orientation/field-of-view data 70 to produce output 68, in accord with an embodiment.

Discrete wavelet transform 104 of process 100 converts raster height field data 22 (which is, for example, raw terrain elevation data) into wavelet encoded height field data 24, utilizing sub-band decomposition. Process 100 is, for example, a pre-processing step to produce data 24, and may occur only once.

Process 106 is for example performed by computer 52 under the control of loaded 3D run-time terrain renderer software 62', FIG. 1B. In step 108, loaded scene manager 64' directs computer 52 utilizing location/orientation/field-of-view data 70 to identify, within wavelet-encoded height field data 24, terrain blocks 25 utilized at each LOD to produce output 68. In step 110, process 106 loads identified terrain blocks 25 from wavelet-encoded height field data 24 as loaded terrain blocks 25' of working set 66, FIG. 1B. In step 112, process 106 renders output 68 utilizing loaded terrain blocks 25' and location/orientation/field-of-view data 70, as directed by loaded scene manager 64'.

Figure 2B:
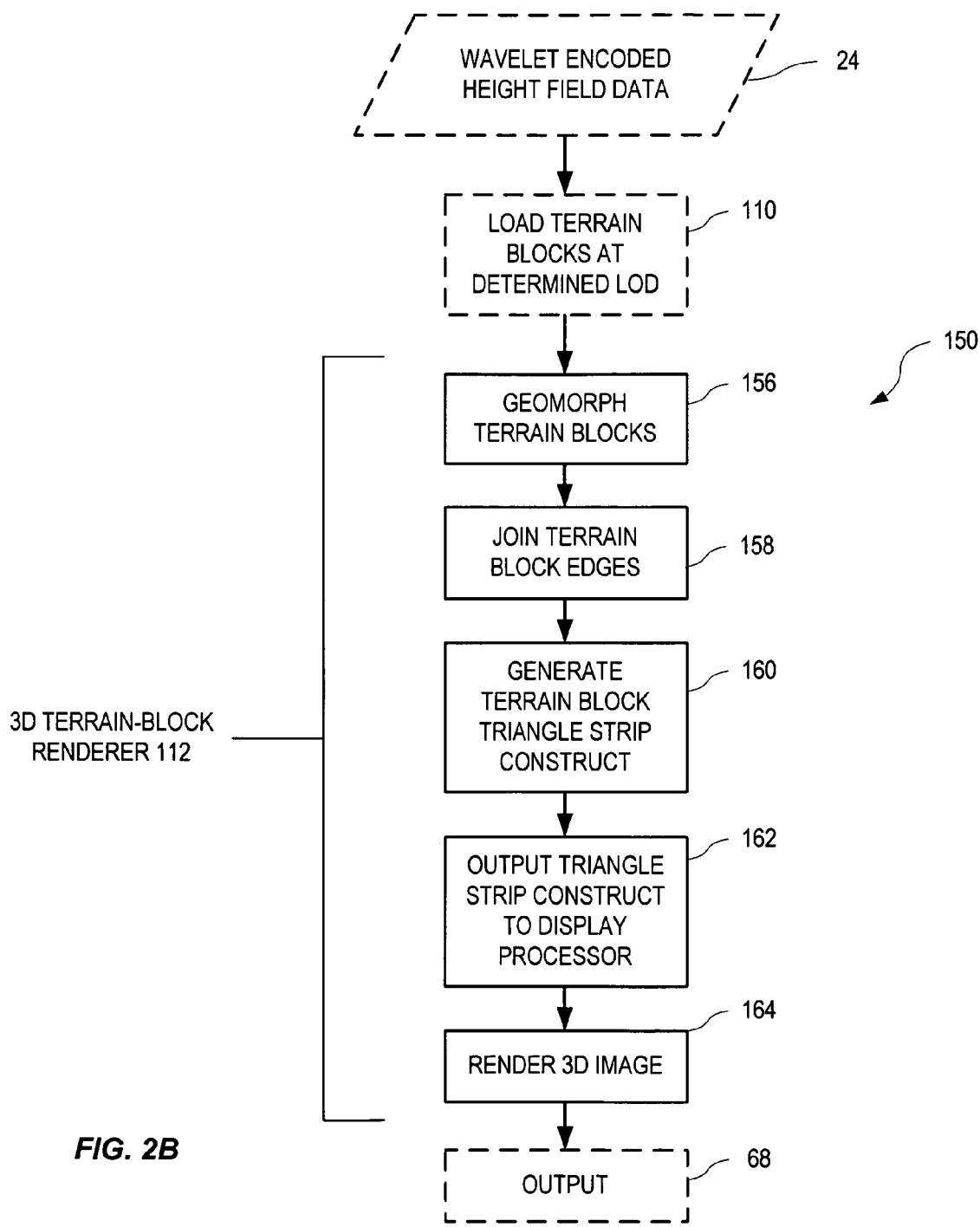
FIG. 2B shows a flowchart illustrating one exemplary process suitable for use as a step of the process of FIG. 2A, for processing terrain blocks and location/orientation/field-of-view data to produce output.

FIG. 2B shows a flowchart illustrating one exemplary process 150 suitable for use as step 112 of process 106, FIG. 2A, for processing terrain blocks (e.g., loaded terrain blocks 25') and location/orientation/field-of-view data 70 to produce output 68. Process 150 may be performed by computer 52 under control of loaded 3D run-time terrain renderer software 62', for example. Wavelet-encoded height field data 24, step 110 of process 106, and display output 68 are shown with dashed lines to illustrate processing context of process 150.

In step 156, process 150 performs a geomorph on terrain-blocks loaded in step 108 of process 106. The geomorph eliminates vertex 'popping' artifacts on display output 68 by smoothly interpolating geometries of terrain-blocks loaded in step 108 (see also FIG. 7A, FIG. 7B and FIG. 8). In step 158, process 150 performs an edge-join operation to correct anomalies where terrain blocks of differing LOD join. In step 160, process 150 organizes working set 26 into a triangle strip construct for rendering. In step 162, process 150 outputs the triangle strip construct to display processor 20, FIG. 1. In step 164, display processor 20 utilizes the triangle strip construct to render a 3D image, to produce output 68. It will be appreciated that certain steps of process 150 may be performed in a different order than the order listed; for example, step 160 may precede step 158, or steps 160 and steps 162 may be performed concurrently, in certain applications.

Figure 2C:
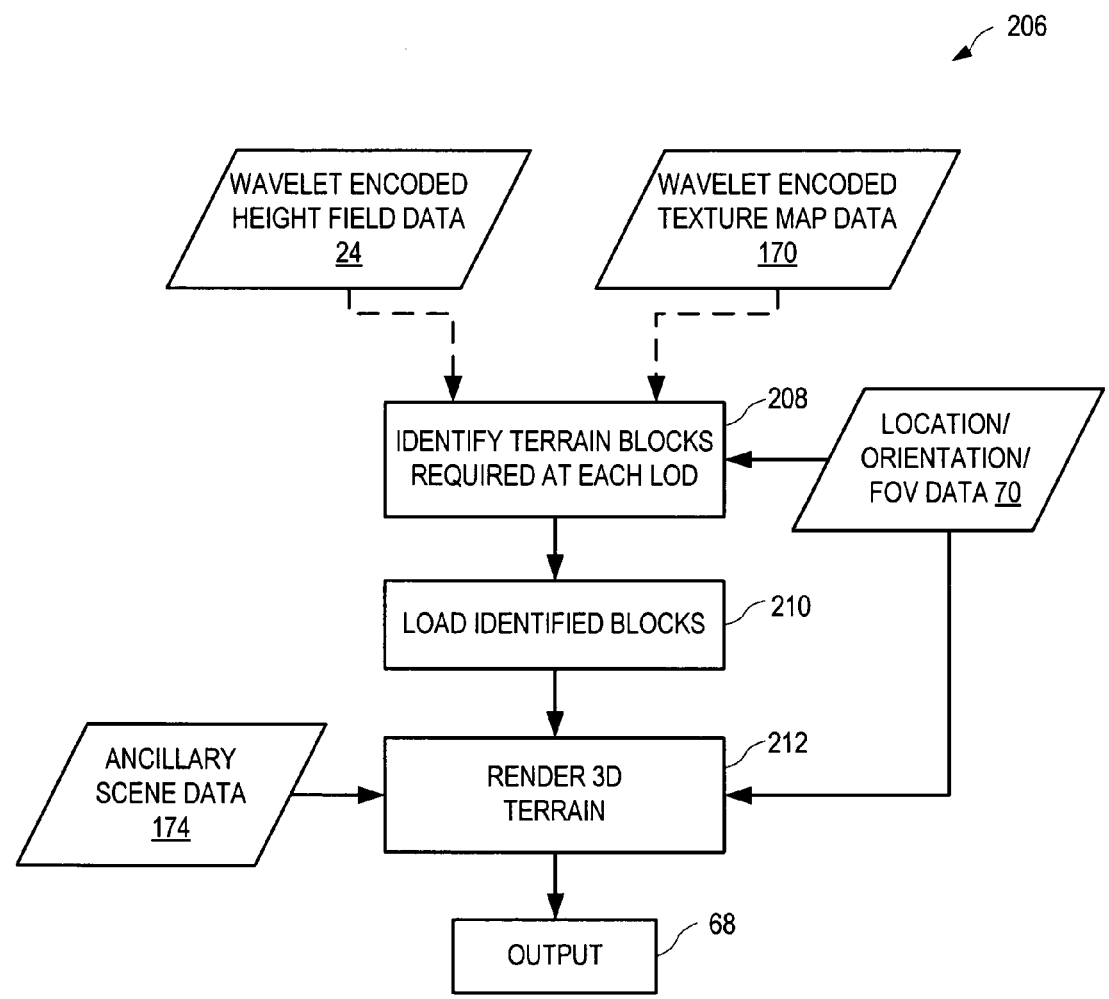
FIG. 2C shows a flowchart illustrating one exemplary process that uses wavelet-encoded height field data, wavelet encoded texture map data, ancillary scene data and location/orientation/field-of-view data to produce output

FIG. 2C shows a flowchart illustrating one exemplary process 206 that uses wavelet-encoded height field data 24, wavelet encoded texture map data 170, ancillary scene data 174 and location/orientation/field-of-view data 70 to produce output 68, in accord with an embodiment. Like process 106, process 206 is for example performed by computer 52 under the control of loaded 3D run-time terrain renderer software 62', FIG. 1B. While process 106 renders a 3D terrain height image, process 206 adds texture information and ancillary scene data for increased realism and usefulness of output 68. Raw texture map data is analogous to raster height field data 22, FIG. 1A; a process that produces wavelet encoded texture map data 170 is analogous to process 100, FIG. 2A; wavelet-encoded texture map data 170 is analogous to wavelet-encoded height field data 24, FIG. 1B. Ancillary scene data may include flight-aid graphical elements and/or icons that may provide additional flight situational awareness when depicted within a rendered scene context in output 68 (see also FIG. 3).

In step 208, loaded scene manager 64' directs computer 52 utilizing location/orientation/field-of-view data 70 to identify (a) specific terrain blocks 25 within wavelet-encoded height field data 24 and (b) texture blocks within wavelet encoded texture map data 170, that are required at each LOD to produce output 68. In step 210, process 206 loads identified terrain blocks 25 and identified terrain blocks into working set 66, FIG. 1B. In step 212, process 206 renders output 68 utilizing loaded terrain blocks 25', loaded texture blocks, ancillary scene data 174, and location/orientation/field-of-view data 70, as directed by loaded scene manager 64'.

Wavelet-Encoded, Multiple-Level-of-Detail Terrain Data Storage

Typically, raster height field data 22, FIG. 1A, originates as a raster-ordered, regular matrix of values where each value represents the height of terrain at a particular x, y location; it is thus a parametric surface whereby height is a function of the x and y coordinates. Height values are typically formatted as a signed 16-bit integer, although, alternatively, larger integer or floating point formats may be used as required by a particular application. In one embodiment, system 10 processes raster height field data 22 into a wavelet-encoded form using a DWT yielding a resulting dataset (e.g., wavelet-encoded height field data 24) as source data for loaded 3D run-time terrain renderer software 62'. Texture map data typically originates as a raster-ordered regular matrix of pixels (e.g., an image). Each pixel of the texture map image may be, for example, composed of an 8-bit red value, an 8-bit green value, and an 8-bit blue value (i.e., a 24-bit Red-Green Blue "RGB" color pixel). Texture map data typically originates as raster image data at a higher level of detail than terrain data 22, but it may originate at the same, or a lower, level of detail than terrain data 22. In one embodiment, system 10 processes raster texture map data into a wavelet-encoded form using a DWT yielding a resulting dataset (e.g., wavelet-encoded texture map data 170) as source data for loaded 3D run-time terrain renderer software 62'. Ancillary scene data 174 may be stored as an arbitrary list of numeric geometric object descriptions that may include x, y, z vertices, may be associated with x, y, z object points, areas, or volumes in space, and may represent general cartographic features and fixed items (e.g., towers, buildings, runways), movable items (e.g., vehicles, aircraft) or flight-path or vehicle passage corridor representations (e.g., indications of the intended paths of aircraft and/or land vehicles). Loaded scene manager 64' may determine when a specific item of ancillary scene data 174 should be included in output 68.

Figure 3:
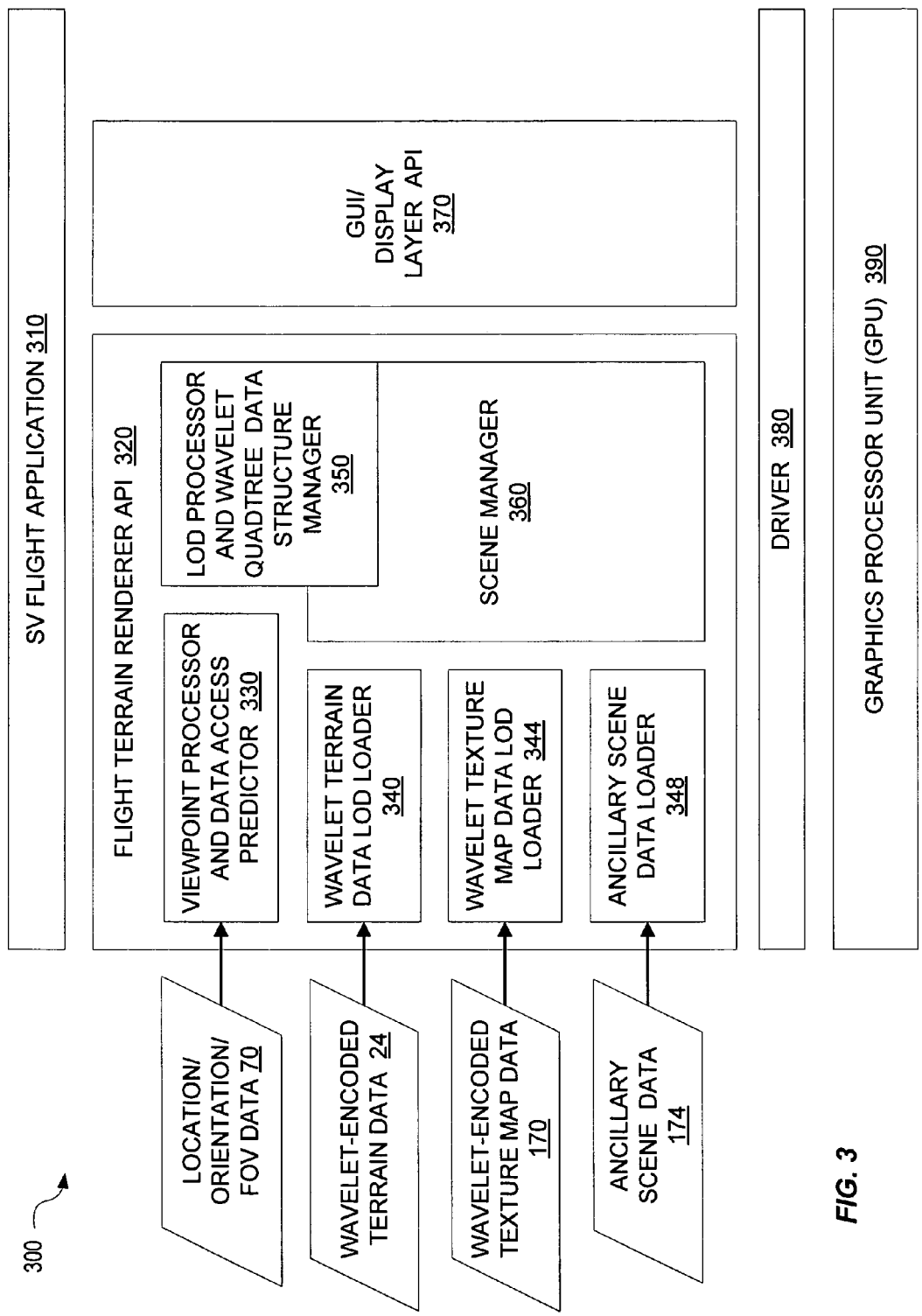
FIG. 3 shows one flight-based 3D terrain rendering software system, illustrating functional software blocks suitable for progressive mesh storage and reconstruction using wavelet-encoded height fields.

FIG. 3 shows one flight-based 3D terrain rendering software system 300, illustrating functional software blocks suitable for progressive mesh storage and reconstruction using wavelet-encoded height fields, in accord with an embodiment. System 300 includes a synthetic vision ("SV") flight application 310 that may be, for example, software that directs a computer (e.g., computer 52, FIG. 1B) aboard an aircraft. Flight application 310 is in communication with a flight terrain renderer applications program interface ("API") 320 that includes an LOD processor and wavelet quadtree data structure manager 350 and a scene manager 360. API 320 also includes a viewpoint processor and data access predictor 330 that receives location/orientation/FOV data 70, a wavelet terrain data LOD loader 340 that receives wavelet-encoded terrain data 24, a wavelet texture map data LOD loader 344 that receives wavelet-encoded texture map 170, and an ancillary scene data loader 348 that receives ancillary scene data 174. Flight application 310 and API 320 are in communication with a Graphical User Interface ("GUI")/Display layer API 370. API 320 and API 370 generate output that is received by a Graphics Processor Unit ("GPU") 390 via a graphics device driver 380, such as an OpenGL driver, which processes the output into a format recognized by GPU 390. GPU 390 processes data received from API 320 and API 370 via driver 380 to produce output (e.g., output 68, not shown) that may be displayed, for example, on one or more monitors of an aircraft.

One advantage of using a wavelet-encoded form of terrain data may be to provide a compact, multiple-level-of-detail representation of the original data (see, e.g., FIG. 4). Wavelet encoding of raster height field data 22 to produce wavelet-encoded terrain height field data 24 generates a plurality of spatially-filtered levels of detail, similar to texture mipmapping. The DWT uses digital sub-band filters to decompose raster height field data 22 into groups of components, namely a low-frequency component and high-frequency components in the y-, x-, and xy-directions.

Figure 4A:
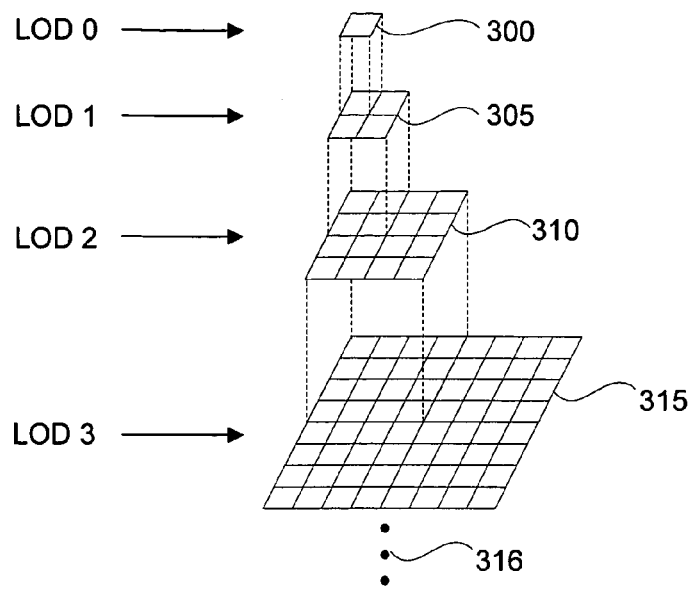
FIG. 4A and FIG. 4B illustrate relationships among wavelet-encoded terrain blocks at various levels of detail ("LOD").
Figure 4B:
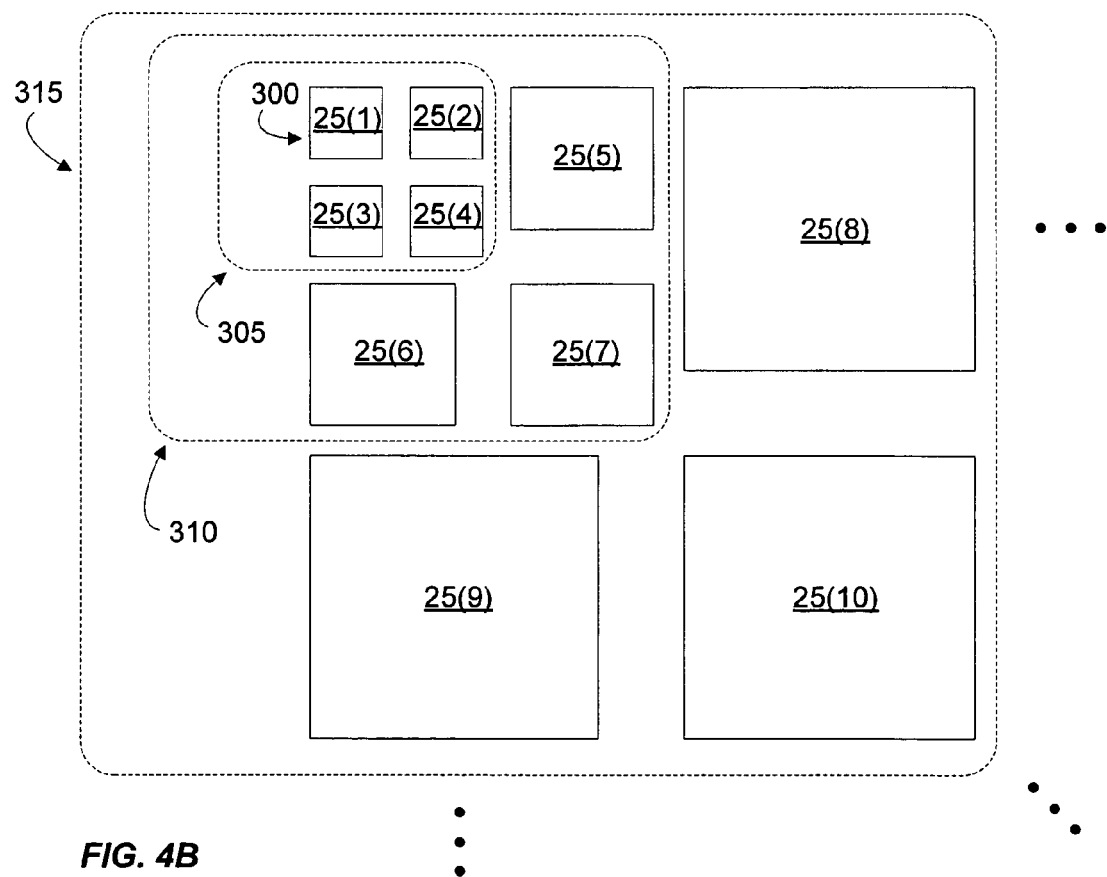

FIG. 4A and FIG. 4B illustrate relationships among wavelet-encoded terrain blocks 25 at various LOD, in accord with an embodiment. The DWT process breaks the original data into powers-of-2-sized blocks containing spatial detail to a given LOD, where each block at a higher LOD contains high-frequency components to increase LOD of a reconstructed image, compared to blocks of lower LOD. In FIG. 4A and FIG. 4B, a data set 300 includes only terrain block 25(1) at LOD 0. Data set 305 includes data set 300 and additional terrain blocks 25(2), 25(3) and 25(4) that contain y-direction, x-direction, and xy-direction information, respectively, at LOD 1 for the terrain represented by terrain block 25(1). Data set 310 includes data set 305 and additional terrain blocks 25(5), 25(6) and 25(7) that contain y-direction, x-direction, and xy-direction information, respectively, at LOD 2 for the terrain represented by terrain block 25(1). Data set 315 includes data set 310 and additional terrain blocks 25(8), 25(9) and 25(10) at LOD 3.

Only four LOD levels are shown in FIG. 4A and FIG. 4B, for clarity of illustration; though additional possible LOD levels are suggested by ellipsis 316. The number of levels used in a DWT process may be arbitrary, though they may depend upon source image size and a smallest reconstructable block size. Each level may create, for example, x-direction, y-direction, and xy-direction detail for a ½-size (in each axis) LOD+1 block of the preceding level (e.g., LODn is the full-size image, LODn−1 is ½ size, LODn−2 is ¼ size, and so on, down to LOD0 that represents the lowest level of detail representation of the original source data). The number of levels used in wavelet decomposition may therefore be described as a function of source height field size and the smallest desired reconstructable terrain block size, as follows:

DWT levels=$\log_2$(Height Field Edge Length)−$\log_2$(Terrain Block Edge Length)+1

As wavelet decomposition stores data as the smallest size image (sometimes denoted herein as a "DC component"), with each ascending level's high-frequency information (sometimes denoted herein as "AC components"), the next-highest LOD may be generated. For instance, a 6-level wavelet decomposition has a $\frac{1}{2}^5$, or $\frac{1}{32}$ size image as its lowest LOD0 form along with the successive high-frequency components for the $\frac{1}{16}$, $\frac{1}{8}$, $\frac{1}{4}$, $\frac{1}{2}$, and full-size image LODs. See, e.g., FIG. 4A and FIG. 4B. The wavelet subband filters used are those of the reversible (lossless) integer biorthogonal 5/3 Daubechies form and the irreversible (lossy) biorthogonal 9/7 Daubechies form, although the use of other wavelet subband filters, such as those with minima- and maxima-preserving characteristics, is contemplated and may be more appropriate for some applications. The wavelet-transformed height field is partitioned and indexed into spatially-contiguous blocks providing for efficient access to arbitrary LODs and spatial regions of interest.

Figure 5A:
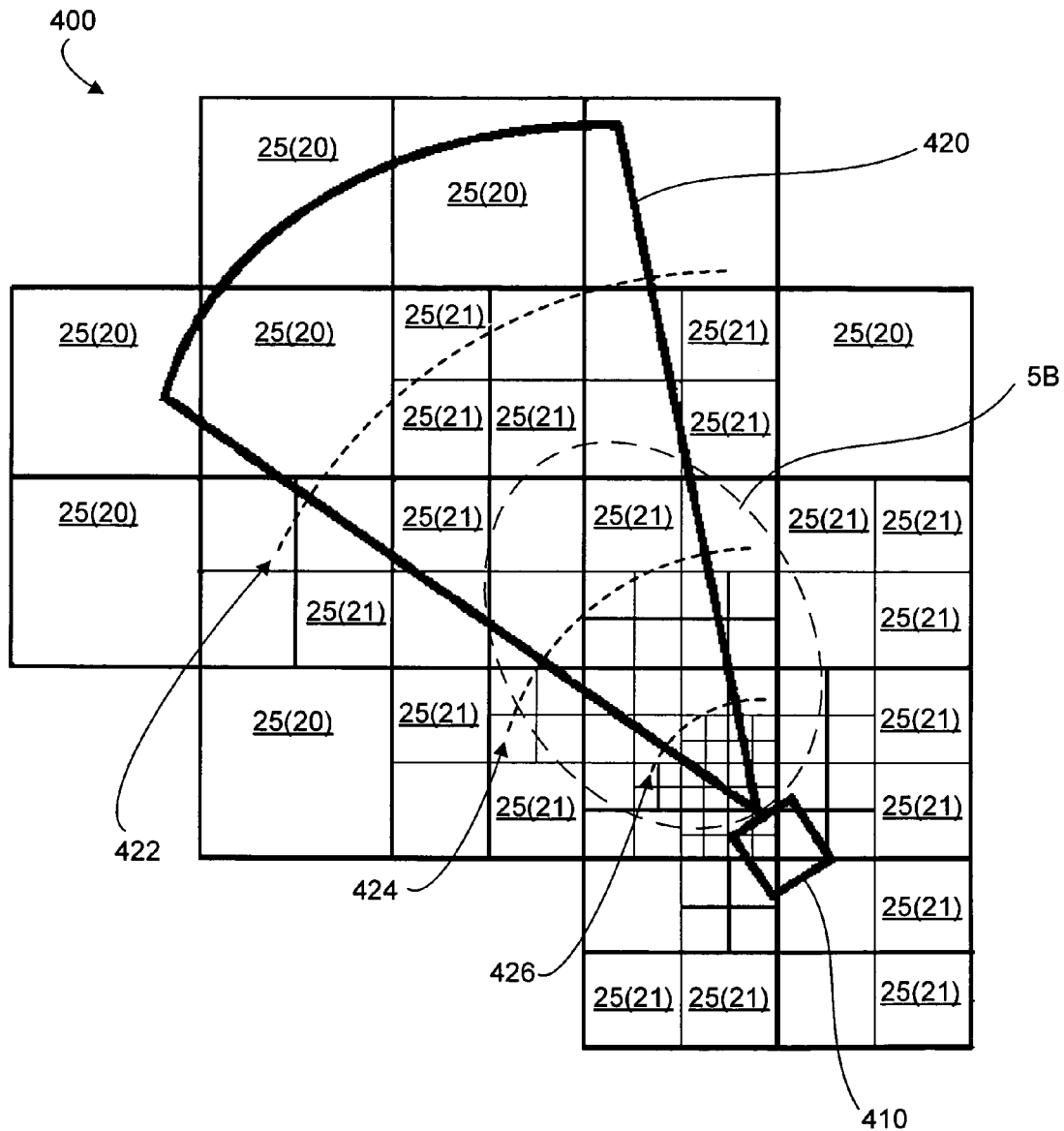
FIG. 5A and FIG. 5B illustrate view frustum focused determination of wavelet-encoded terrain blocks containing height data of an area for rendering a scene.
Figure 5B:
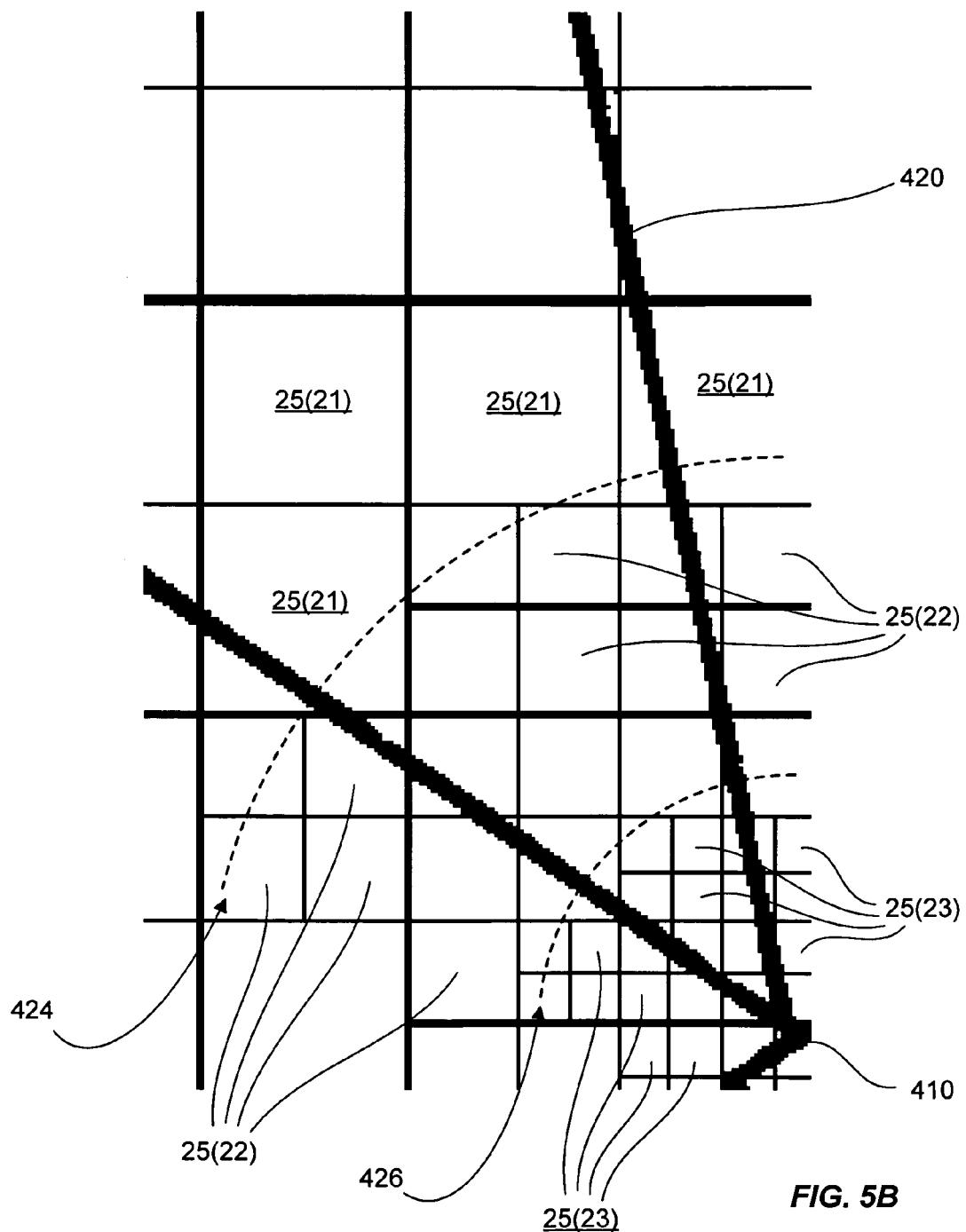
Figure 6:
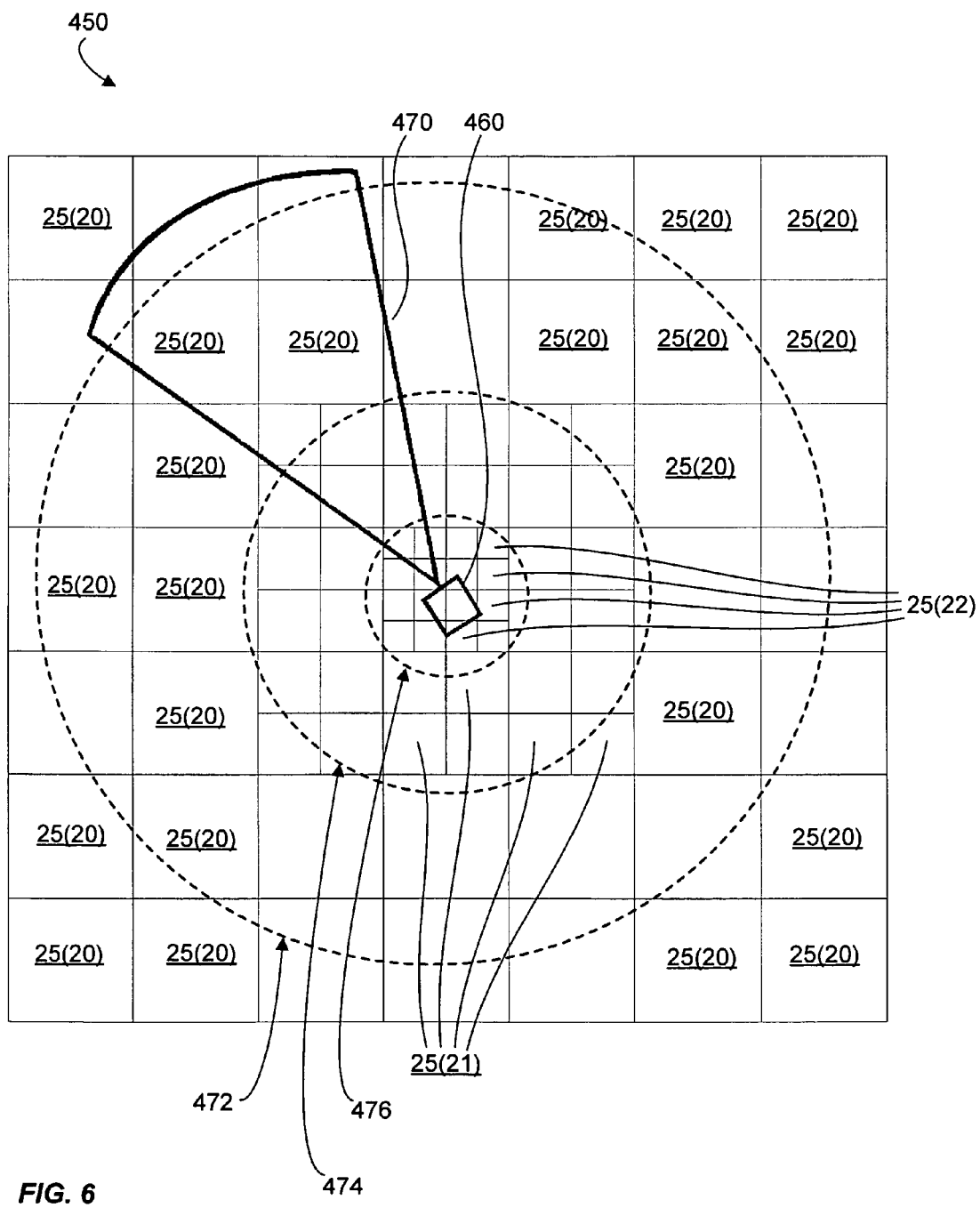
FIG. 6 illustrates omni-directional determination of wavelet-encoded terrain blocks containing height data of an area for rendering a scene.

A further illustration showing a 3-level wavelet decomposition of a 16-bit terrain height field into three resolution levels may be seen in FIGS. 5, 6, 7 of U.S. Provisional Patent Application No. 60/569,332, which is incorporated herein by reference.

The wavelet-encoding process efficiently stores multi-LOD forms of an image, for example using the encoded "image" as the 16-bit-per-height raster height field. When levels at one LOD are each one-half the size in each axis of a next higher LOD, the data may form an LOD quadtree data structure; each height field block at one LOD corresponding with four height field blocks in the next highest LOD.

For an 8-level, wavelet-encoded height field with a 64×64 minimum terrain-block size, the following number of terrain-block grids and total height field size for the LOD may be given:

| LOD level | Grid of 64 × 64 terrain blocks | Total LOD height field size |
| --- | --- | --- |
| LOD0 | 1 × 1 | 64 × 64 |
| LOD1 | 2 × 2 | 128 × 128 |
| LOD2 | 4 × 4 | 256 × 256 |
| LOD3 | 8 × 8 | 512 × 512 |
| LOD4 | 16 × 16 | 1024 × 1024 |
| LOD5 | 32 × 32 | 2048 × 2048 |
| LOD6 | 64 × 64 | 4096 × 4096 |
| LOD7 | 128 × 128 | 8092 × 8092 |

Although the resulting wavelet-encoded data may include only height values, the sequence of the height values within the wavelet-encoded data allows for efficient reconstruction of a complete 3D x, y, z height vertex representation, eliminating the need to store full x, y, and z coordinates for each height value.

3D Terrain Block Renderer

In one embodiment, terrain rendering by system 50, FIG. 1B, processes terrain data primarily as blocks of data, rather than as individual terrain vertices. The wavelet-encoded format of terrain data (e.g., wavelet-encoded height field data 24 as discussed in the preceding section) provides needed terrain blocks at needed LOD at run time. Under the control of loaded scene manager 64', system 50 sets up a scene and determines which terrain blocks are necessary to provide detail at various depths in the scene relative to a viewpoint. For instance, foreground terrain may be rendered using high-LOD blocks, whereas background terrain may utilize low-LOD blocks of terrain data. Regardless of LOD, all blocks may have the same number of vertices; because of the quadtree data structure of the wavelet-encoded terrain data, the spatial dimensions of a block may be one-half (in each axis) the size of a block at a lower LOD. Thus, a number of vertices in a scene is moderated block by block rather than vertex by vertex, conserving considerable central processor unit (CPU) effort. Certain processing may be performed vertex by vertex, such as geomorphing and generation of triangle strips, as discussed below.

FIG. 5A illustrates view frustum focused determination of wavelet-encoded terrain blocks 25 containing height data of an area 400 for rendering a scene, in accord with an embodiment. A desired viewpoint 410 is provided as part of location/orientation/FOV data 70; loaded scene manager 64' uses data 70 to generate a view frustum 420, in this example, to identify terrain blocks 25 with varying LOD based on distance of each terrain block from viewpoint 410. Only some terrain blocks 25 are labeled within FIG. 5 for clarity of illustration. Terrain blocks 25(20) at a distance from viewpoint 410, or significantly outside view frustum 420, are at a low LOD (here denoted LOD n). Terrain blocks 25(21) that are closer to viewpoint 410 (e.g., closer to viewpoint 410 than about line 422) are at LOD n+1. Terrain blocks 25(22) that are still closer to viewpoint 410, and terrain blocks 25(23) that are still closer to viewpoint 410 are not labeled within FIG. 5B for clarity of illustration; a region labeled 5B is shown in FIG. 5B, showing terrain blocks 25(22) and 25(23). The use of four LODs in FIG. 5A is illustrative only; more or fewer LODs may be used, with the distances utilized to determine loading of each LOD demarked by a correspondingly larger set of lines (e.g., like lines 422, 424 and 426). It should be apparent that the number of LODs may be arbitrarily large, limited only by a density of the raster data that is processed to form wavelet encoded terrain blocks 25. At a highest level of detail, wavelet-encoded height field data 24 may include information that enables exact reconstruction of a scene to the level of detail stored in raster height field data 22.

FIG. 5B is an enlarged illustration of region 5B of FIG. 5A. Terrain blocks 25(22) that are closer to viewpoint 410 than about line 424 are at LOD n+2 (compared to the LOD of blocks 25(20) and 25(21) of FIG. 5A); Terrain blocks 25(23) that are closer to viewpoint 410 than about line 426 are at LOD n+3.

The example shown in FIG. 5A and FIG. 5B illustrates only one way that terrain blocks of specific spatial areas and LOD may be identified. In FIG. 5A and FIG. 5B blocks in or near view frustum 420 are preferentially loaded, or loaded at higher LOD, as compared to blocks that are significantly outside view frustum 420. Other embodiments may utilize different methods of loading terrain blocks corresponding with specific spatial areas and LOD.

FIG. 6 illustrates omni-directional determination of wavelet-encoded terrain blocks 25 containing height data of an area 450 for rendering a scene, in accord with an embodiment. The example of FIG. 6 loads an omni-directional ("bomb blast") pattern of blocks 25 based on a location of a viewpoint 460. The "bomb blast" pattern utilizes only distance from viewpoint 460 to determine an LOD at which a given terrain block 25 is loaded. For example, in FIG. 6, terrain blocks 25 that correspond to locations within about a small distance from viewpoint 460 (indicated by a line 476) are loaded at LOD n+2 as terrain blocks 25(22). Terrain blocks 25 that correspond to locations within about a larger distance from viewpoint 460 (indicated by an area between line 476 and line 474) are loaded at LOD n+1 as terrain blocks 25(21). Terrain blocks 25 that correspond with locations within a still larger distance from viewpoint 460 (indicated by an area between line 474 and line 472) are loaded at LOD n as terrain blocks 25(20).

While the pattern illustrated in FIG. 5 loads spatial areas within or near view frustum 410 at higher LOD than areas that are not within or near view frustum 410, the "bomb blast" pattern illustrated in FIG. 6 may load data at a given LOD in all directions from viewpoint 460. Loading at least some data, or loading data at a higher LOD, in directions that are not within a current view frustum may facilitate transitions wherein the view frustum moves (e.g., because an aircraft changes course, or because a user looks in a different direction). Other schemes for identifying terrain blocks at specific spatial locations and/or LOD for loading may be used. One such scheme identifies terrain blocks based on recent aircraft movements; for example, if an aircraft has been turning right, terrain blocks to the right of the center of the current view frustum may be loaded at higher LOD. In another example, a scheme identifies terrain blocks based on a predetermined flight plan.

In one embodiment, system 50 accesses terrain blocks at varied levels of detail from wavelet-encoded source data, depending on viewpoint location and/or orientation; but it does not cull out individual vertices based on the viewpoint. Reconstructed terrain blocks are LOD-filtered and scaled by the wavelet decomposition process to eliminate further vertex-by-vertex processing. Such terrain rendering may therefore represent a hybrid between a View Independent Progressive Mesh (VIPM) and a View Dependent Progressive Mesh (VDPM) methodology; except run-time processing performance of a VDPM approach (minimized triangle count at run-time based on viewpoint) is achieved without the vertex-by-vertex CPU processing overhead required by other VDPM approaches.

System 50 of FIG. 1B may for example utilize wavelet-encoded height field data 24 that forms a quadtree structure to facilitate tracking of terrain block levels of detail and to determine, based on viewpoint distance to each block, for example, a required terrain block LOD per a view-space error metric. A quadtree structure may facilitate identification of terrain blocks 25 used for a current scene. Only identified terrain blocks 25 are loaded into system memory (e.g., into working set 66, FIG. 1B) for rendering. As additional detail is required for a particular spatial area within a scene, the associated terrain block "splits" into four higher-LOD blocks (e.g., referring to FIG. 4, additional x-direction, y-direction and xy-direction data, that corresponds with an existing lower LOD block, is loaded). Also, blocks deemed unnecessary for the current scene are unloaded from memory in a data culling process, to eliminate unnecessary wavelet-encoded terrain-block data accesses and terrain-block rendering processes outside of the view angle. A quadtree structure may also facilitate data culling.

Terrain blocks 25 may form a wavelet-encoded height field such that x and y locations of each data point may only be implicit, based on sequence of data points within a block, providing a compact height field format for terrain geometry storage and vertex processing. Processes may be used, for example, to convert a scene's terrain block height fields to a smoothly-continuous and efficiently-renderable form. Such processes may be: (a) geomorphing of terrain block height values to provide smooth switching between LOD levels, (b) appending x- and y-axis values to each height value to create a true 3D vertex, (c) arranging the vertices of each terrain block into triangle strips for efficient processing by a typical hardware Graphics Processor Unit (GPU) while (d) tying edge vertices between adjacent terrain blocks with differing LOD. See also FIG. 2B.

In process (a), the height values of each terrain block 25 are geomorphed to provide smooth height transitions between terrain block levels of detail. Since wavelet decomposition process removes spatial components as LOD decreases, height values of blocks at varying LODs may vary, representing the actual spatially filtered height value at each LOD. Geomorphing linearly varies height values of an entire terrain block 25 based on a distance of a viewpoint from the block. A "lifespan" may be attributed to a spatial area at a particular LOD: additional terrain blocks 25 must be loaded to add detail for the area (corresponding to an increasing LOD) for an approaching viewpoint; terrain blocks may be deleted (corresponding to lower LOD) for a receding viewpoint. Geomorphing varies height values of terrain blocks 25 smoothly; accordingly, displayed output does not abruptly change, which can cause "vertex popping" artifacts, when a spatial area switches from one LOD to another.

Figure 7A:
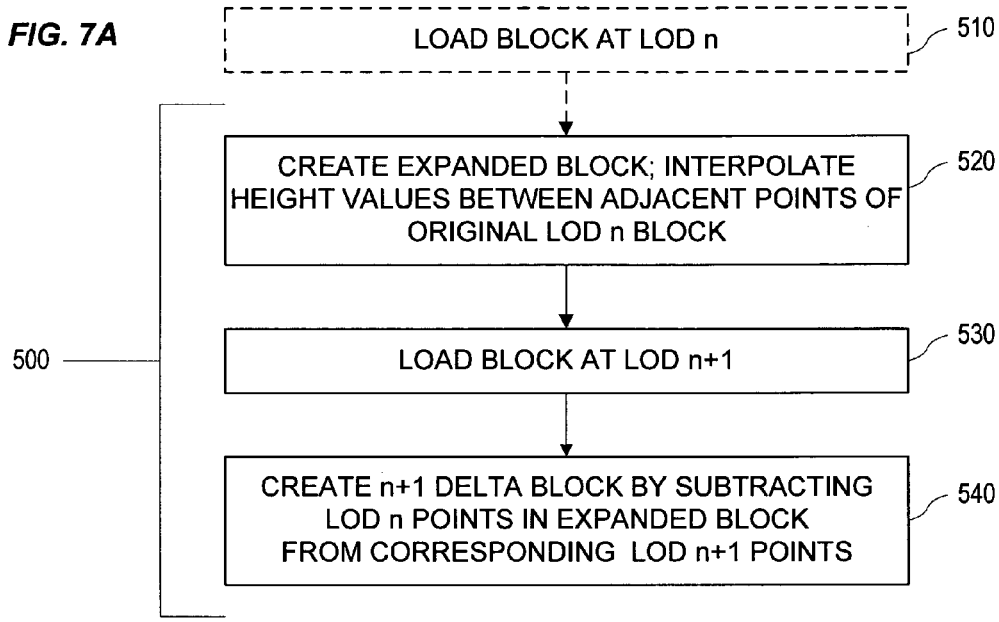
FIG. 7A illustrates a data preparation process for reconstruction using terrain height fields.

FIG. 7A illustrates a data preparation process 500 for reconstruction using terrain height fields. Process 500 may be used, for example, as part of process 110 of FIG. 2A and FIG. 2B, and is for example performed by computer 52 under the control of loaded 3D run-time terrain renderer software 62', FIG. 1B. Process 500 creates a delta block 535 of data (see also FIG. 8) to hold differences between height values between a terrain block 25(25) at one LOD (LOD n) and another terrain block 25(26) at a higher LOD (LOD n+1). Process 500 begins with terrain block 25(25) already loaded into memory (e.g., memory 54, FIG. 1B) in step 510. Step 520 creates an expanded terrain block 25(25)' that includes each data point 515 of terrain block 25(25), and includes data points 517 that correspond to positions between each pair of data points in terrain block 25(25). Data points 517 are created by interpolating data points 515. Expanded terrain block 25(25)' thus includes the number of data points that are included in a terrain block at LOD n+1. Step 530 loads terrain block 25(26) into memory. Step 540 creates delta block 535; each data point 545 of delta block 535 corresponds to a difference between each data point 525 in terrain block 25(26) and the corresponding data point 515 or 517 in expanded terrain block 25(25)'. Process 500 may be used each time a block of higher LOD data is loaded into memory, to create delta blocks that are used during geomorphing, as described below.

Figure 7B:
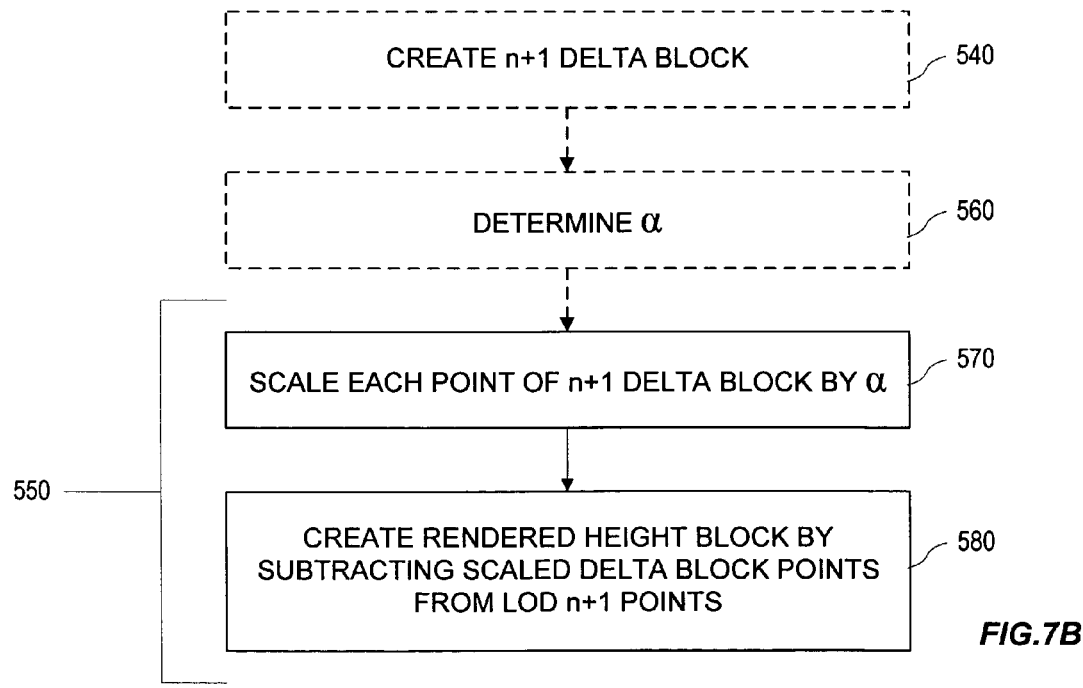
FIG. 7B illustrates a geomorphing process for reconstruction using terrain height fields.

FIG. 7B illustrates a geomorphing process 550 for reconstruction using terrain height fields. Because the terrain rendering process is block based, a computer (e.g., computer 52) may evaluate a viewpoint-to-block distance parameter α for each terrain block 25—rather than for each height value (vertex)—for LOD determination, reducing CPU involvement in the rendering process. Process 550 is a linear height adjustment utilizing distance parameter α that is scaled to a value between 0.0 and about 1.0 depending on distance of a terrain block 25 from a viewpoint (e.g., viewpoint 410 or viewpoint 460, see FIG. 5 and FIG. 6) relative to terrain blocks 25 of a greater or lesser LOD.

For example, in FIG. 5B, terrain blocks 25(23) that are adjacent to terrain blocks 25(22) near line 426 should be scaled the same. This may be accomplished by assigning an α of about 1.0 to terrain blocks 25(3) near line 426, and assigning an α of about 0.0 to terrain blocks 25(3) near line 426. Likewise, terrain blocks 25(22) that are adjacent to terrain blocks 25(21) near line 424 may be scaled the same, so an α of about 1.0 is assigned to terrain blocks 25(2) near line 424, and an α of about 0.0 is assigned to terrain blocks 25(1) near line 426. The exact value of α assigned to each block is determined from the average distance of the block from viewpoint 410.

Process 550 begins with delta block 535 having been created (e.g., by step 540 process 500) and with a determined in step 560. Step 570 scales each data point 545 of delta block 535 by multiplying it by α. Step 580 subtracts the scaled values from the corresponding data points 525 of terrain block 25(26), to create a rendered block 575. Thus, geomorphing process 550 provides linear height value interpolation between reconstructed terrain block LODs, yielding continuous and spatially-filtered terrain heights as seen from viewpoint 410. Process 550 may be repeated each time viewpoint 410 moves within scene 400 (because the movement of viewpoint 410 changes α).

Figure 8:
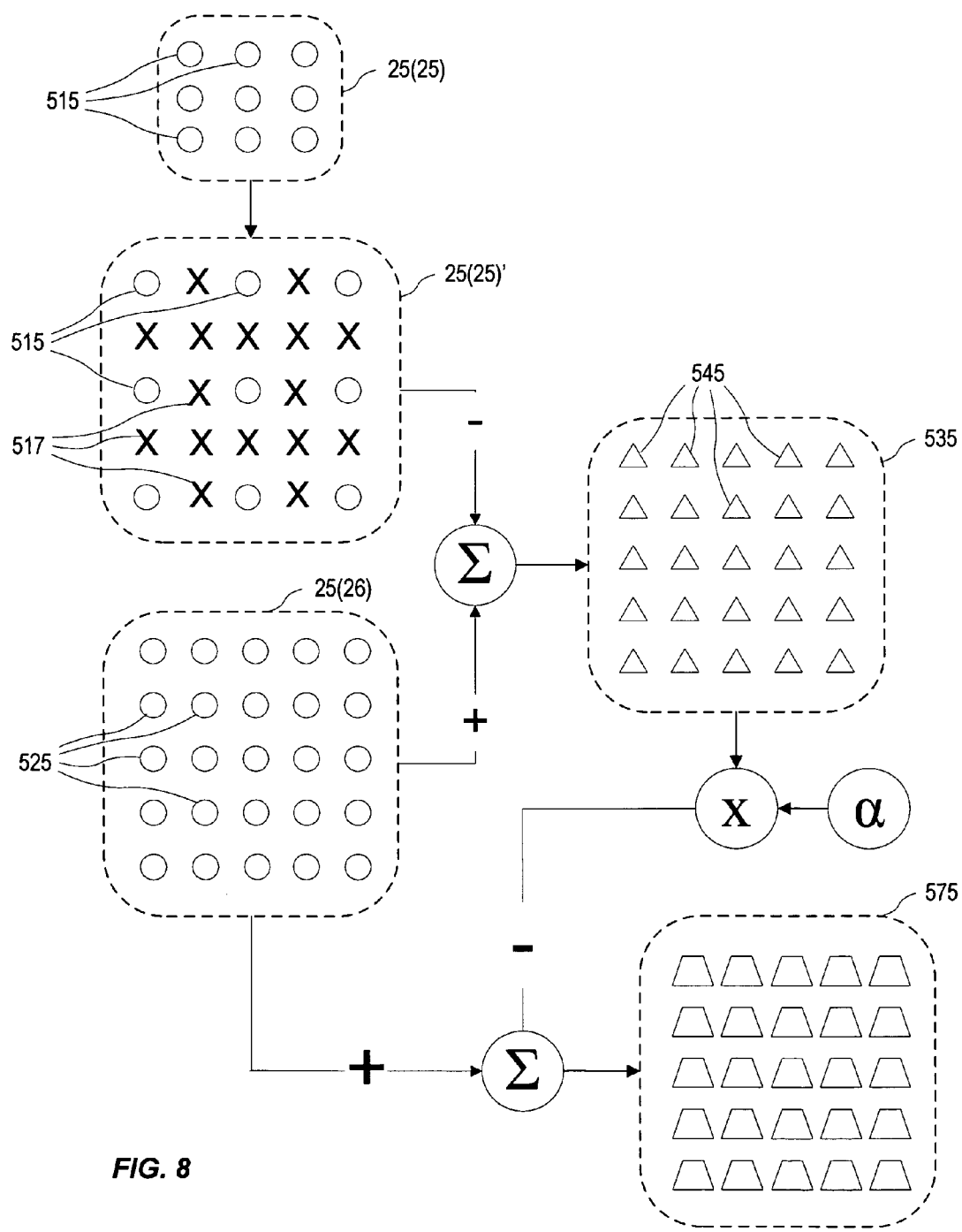
FIG. 8 illustrates the steps performed in the processes of FIG. 7A and FIG. 7B from a terrain block data perspective.

FIG. 8 illustrates the steps performed in processes 500 and 550 from a terrain block data perspective. Terrain block 25(25)' is created from LOD n terrain block 25(25) in step 520 by adding interpolated data points 517 to the original data points 515 of terrain block 25(25). After LOD n+1 terrain block 25(26) is loaded in step 530, delta block 535 is created in step 540 by subtracting each data point 515 or 517 of terrain block 25(25)' from a corresponding data point 525 of terrain block 25(26). After α for a specific scene is determined for block 25(26), each data point 545 of delta block 535 is first multiplied by α in step 570, then subtracted from a corresponding data point 525 of terrain block 25(26) to create rendered block 575 in step 580.

In process (b), height values with implicit x and y locations within the terrain block are converted to explicit 3D vertices having floating point x, y, and z coordinate values. The raster x and y coordinates become the 3D vertex x and z coordinates, respectively. The corresponding height value becomes the y coordinate. Since location of a terrain block 25 within a scene (e.g., scene 400) is known, offset values may be added to convert x and y coordinates of each height value within terrain block 25 to 3D x and z coordinates.

Figure 9A:
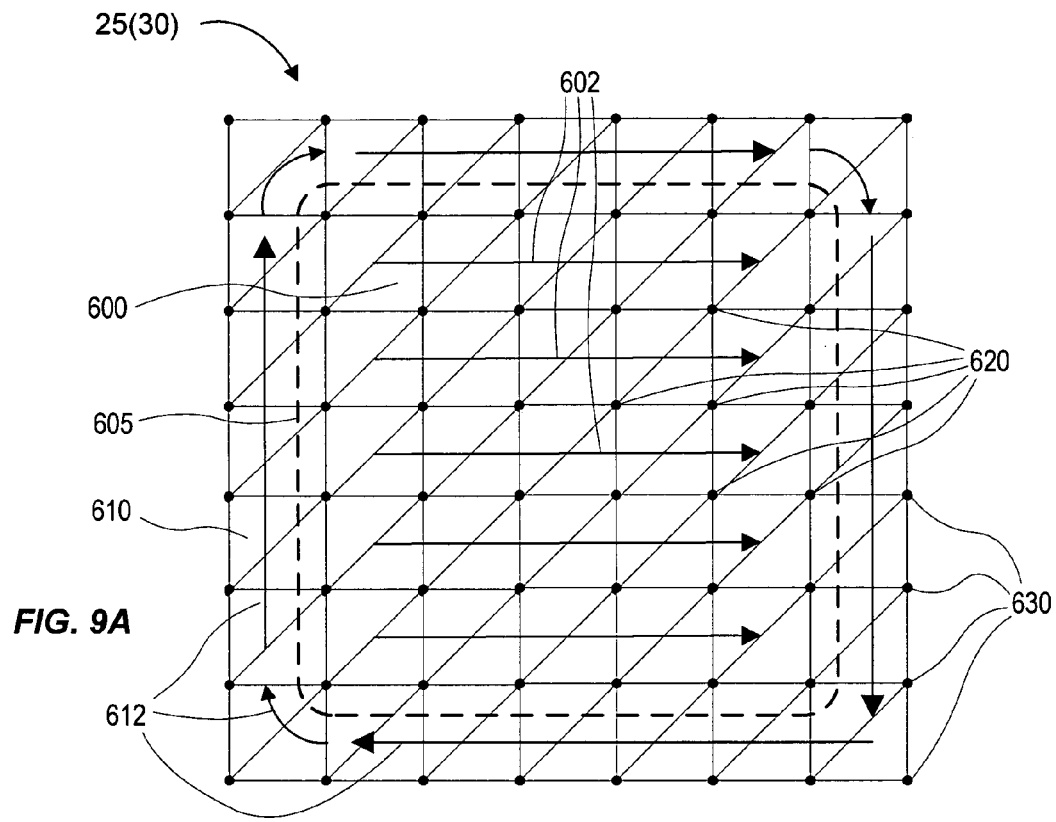
FIG. 9A illustrates generation of triangle strips from a terrain block.

In process (c), vertices are transmitted to a GPU as a set of one or more packed triangle strip constructs. FIG. 9A illustrates generation of triangle strips from a terrain block 25(30). A triangle strip may be, for example, a list of vertices wherein it is understood by a GPU that each of the last three vertices in the list at any time represents a triangle to be rendered; each new vertex added to the list forms a triangle with the two vertices that preceded it. Terrain block 25(30) may be divided into a field area 600 that contains all internal vertices 620 of block 25(30), and a trim area 610 that contains external vertices 630 (for example, external vertices 630 may be single rows and columns of vertices on the perimeter of block 25(30)). Dashed line 605 illustratively separates field area 600 from trim area 610 in FIG. 9A. Arrows 602 indicate the general progression of triangle strip formation through field area 600; arrows 612 indicate the general progression of triangle strip formation through trim area 610. Not all vertices 620, 630 of terrain block 25(30) or all arrows 602, 612 are labeled, for clarity of illustration.

Figure 9B:
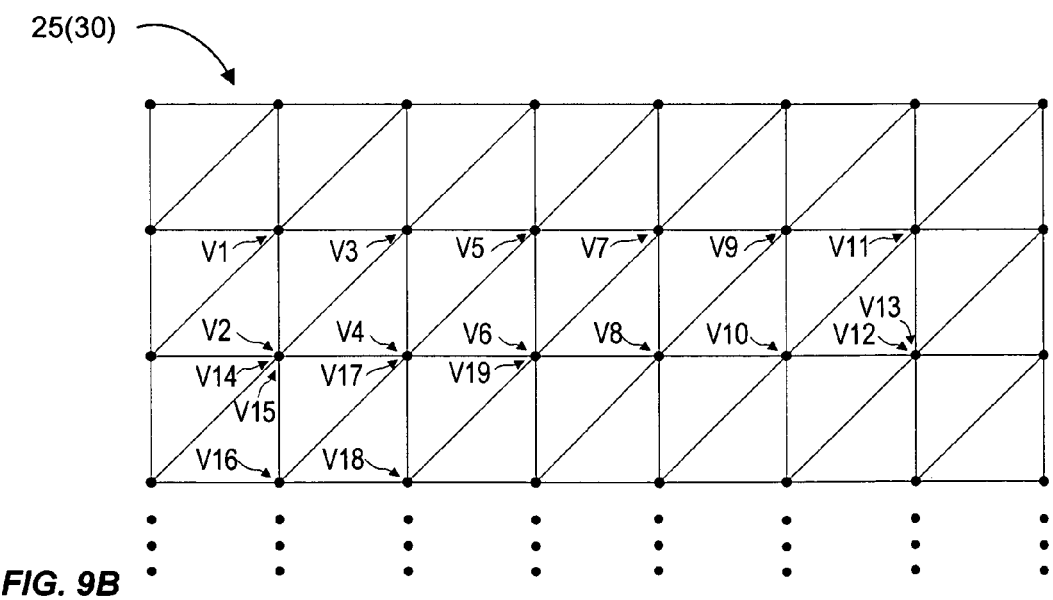
FIG. 9B illustrates initiation of a triangle strip from a portion of the terrain block of FIG. 9A.

Vertices 620 of field area 600 may be transmitted to a GPU as a single triangle strip. FIG. 9B illustrates initiation of a triangle strip from a portion of terrain block 25(30). The vertices that form the beginning of the triangle strip are numbered in the order that they are transmitted. Vertices V1, V2 and V3 form the first triangle in the strip; vertices V2, V3 and V4 form the second triangle, and so forth until vertex V12 is transmitted. After vertex V12, the triangle strip cannot continue with the vertices labeled V14, V15 and V16, because transmitting vertex V14 after vertex V12 would result in the rendering of a triangle consisting of vertices V11, V12 and V14, which is not desired. Instead, vertex V12 is transmitted again as vertex V13, forming a degenerate triangle composed of vertices V11, V12 and V13. Next, vertex V14 is transmitted, forming a degenerate triangle composed of vertices V12, V13 and V14. Next, vertex V14 is transmitted again as vertex V15, forming a degenerate triangle composed of vertices V13, V14 and V15. Next, vertex V16 is transmitted, forming a degenerate triangle composed of vertices V14, V15 and V16. The degenerate triangles may be rendered by the graphics processor, but have zero size, so they do not appear as output. Vertex V17 is transmitted after vertex V16, to form a triangle composed of vertices V15, V16 and V17, to restart the regular formation of triangles across terrain block 25(30) in the direction of arrows 602, continuing with vertices V18 and V19, as shown.

Other sequences of vertex output may be used in place of the specific sequence listed above, depending for example on specific GPU or GPU driver requirements. Vertex sequencing may occur in a different order, or differing sequences of vertex output may form degenerate triangles in a different number or position than those described above. Transmission of the last vertex in field area 600 may terminate a triangle strip.

Trim areas are converted to triangle strips in a similar manner as field edges; however, triangle stripping of trim areas may involve reconciliation of edge effects that may form when, for example, a terrain block is adjacent to a terrain block of a differing LOD. Terrain blocks 25 of one LOD that adjoin terrain blocks 25 of a lower LOD may form T-junctions in the terrain mesh, leaving visual gaps in the subsequent rendering process. To provide a continuous terrain mesh, T-junctions are removed using a vertex-collapse technique.

Figure 10A:
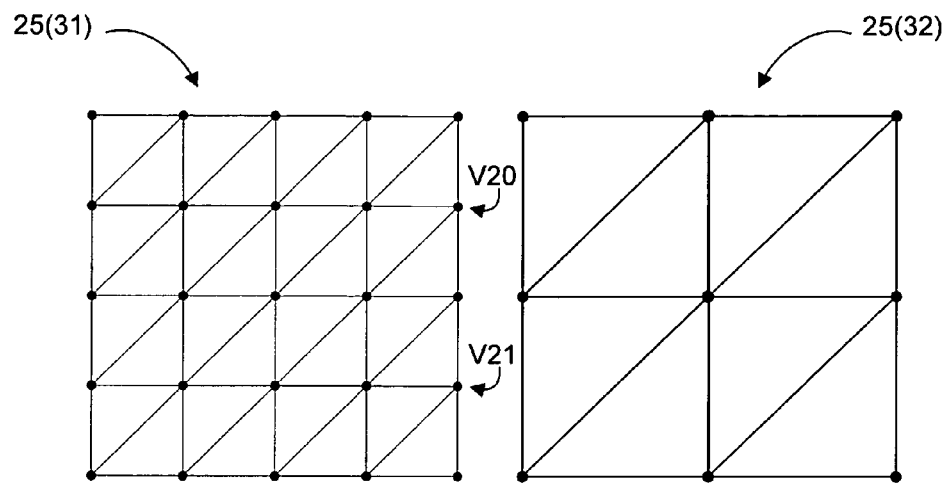
FIG. 10A illustrates a process of joining terrain blocks that have differing LOD.
Figure 10B:
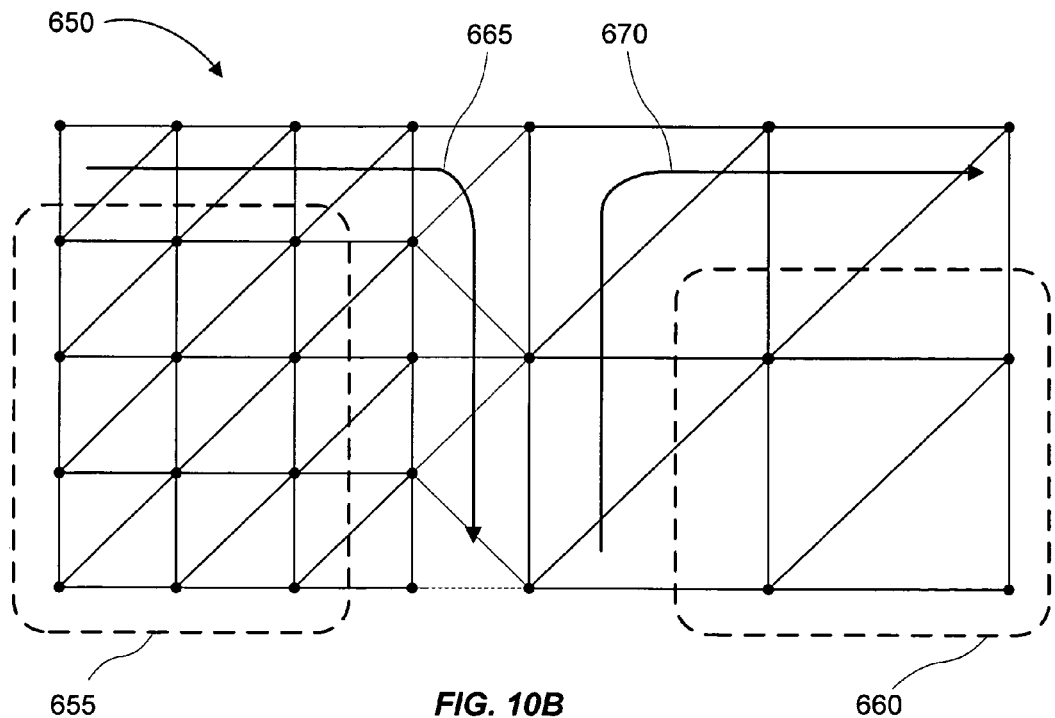
FIG. 10B illustrates a composite terrain block that forms when the terrain blocks of FIG. 10A are joined.

FIG. 10A illustrates a process of joining terrain blocks 25(31) and 25(32) that have differing LOD. Vertices V20 and V21 of terrain block 25(31) are removed to eliminate T-junctions. FIG. 10B illustrates a composite terrain block 650 that forms when terrain blocks 25(31) and 25(32) are joined. Field areas 655 and 660 are converted to triangle strips as described above, and trim areas are converted to triangle strips along the paths of arrows 665 and 670. Specific vertices may be transmitted so that the triangles indicated by solid lines in FIG. 10B are rendered, with certain vertices transmitted multiple times so that degenerate triangles form, to prevent unintended triangles from rendering.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between. It should therefore be apparent that the disclosed systems and methods may be altered without departing from the scope hereof, including the following claims. Such alterations may for example include:

The discrete wavelet transform used to process the original height field data may be operated in either a lossless or lossy mode.

The wavelet encoding process used to reconstruct terrain blocks from the wavelet-encoded data may be such that original height field minima and maxima are preserved in the reconstructed data at all levels of detail.

A sparse height field reconstruction approach may be used wherein high-frequency wavelet coefficients are examined at run time, and coefficients indicating low energy content are used as an indicator for removing certain vertices from a reconstructed terrain block. Removing vertices reduces the terrain block vertex count, and remaining vertices are triangulated in the triangle stripping process.

The wavelet-encoded terrain data may be physically separated from the 3D terrain-block renderer and interconnected via a networked interface.

Any mesh structure describable by a height field may be processed by the systems and methods above.

Terrain block size is not limited to a 64×64 size but may be optimized to GPU hardware capabilities.

The discrete wavelet transform used to process the original height field data may use other wavelet subband filters.

What is claimed is:

1. A method for progressive mesh storage, comprising the steps of:
   reading raster height field data;
   processing the raster height field data with a discrete wavelet transform to generate wavelet-encoded height fields;
   selecting a terrain data block from the processed raster height field data at a power-of-two level of detail, where each block at a higher level of detail contains higher frequency components with respect to a block at a lower level of detail; and
   using the selected data block to reconstruct original source terrain mesh data.

2. The method of claim 1, the step of processing comprising processing the raster height field data into a quadtree structure.

3. The method of claim 1, the step of processing comprising utilizing a wavelet subband filter.

4. The method of claim 3, wherein the wavelet subband filter is one of the integer biorthogonal 5/3 Daubechies form and the biorthogonal 9/7 Daubechies form.

5. The method of claim 1, further comprising storing the wavelet-encoded height fields.

6. A method for progressive mesh storage, comprising the steps of:
   reading raster height field data;
   reading raster texture map data;
   processing the raster height field data and texture map data with a discrete wavelet transform to generate wavelet-encoded terrain fields and texture map fields respectively, the wavelet-encoded fields each having a quadtree structure, at least one section of one of the quadtree structures having at least one different level of detail than another section; and
   storing the wavelet-encoded terrain fields to correspond to related stored texture map fields in a respective manner.

7. The method of claim 6, the step of processing comprising utilizing a wavelet subband filter.

8. The method of claim 7, wherein the wavelet subband filter is one of the integer biorthogonal 5/3 Daubechies form and the biorthogonal 9/7 Daubechies form.

9. A software product comprising instructions, stored on computer-readable media, wherein the instructions, when executed by a computer, perform steps for progressive mesh storage, comprising:
   instructions for reading one of raster height field data and texture map data as input data;
   instructions for processing the input data with a discrete wavelet transform to generate wavelet-encoded data;
   instructions for selecting a terrain data block from the processed raster height field data at a power-of-two level of detail, where each block at a higher level of detail contains higher frequency components with respect to a block at a lower level of detail; and
   instructions for using the selected data block to reconstruct original source terrain mesh data.

10. A method for progressive mesh storage, comprising the steps of:

reading raster height field data;

processing the raster height field data with a discrete wavelet transform into a quadtree structure to generate wavelet-encoded height fields, at least one section of the quadtree structure having a different level of detail than another section of the quadtree structure;

selecting a terrain data block from the processed quadtree structure at a power-of-two level of detail particular to a selected section of the quadtree structure; and using the selected data block to reconstruct original source terrain mesh data.

11. The method of claim 6, the step of storing includes indexing the wavelet-encoded fields by level of detail and spatial location.

12. A method for progressive mesh storage, comprising the steps of:

reading raster height field data;

processing the raster height field data with a discrete wavelet transform to generate wavelet-encoded height fields;

selecting terrain data blocks from the processed raster height field data at a power-of-two level of detail; and reconstructing original source terrain data into a continuous terrain mesh from the selected terrain data blocks, the continuous terrain mesh having a regular, grid-shape comprising rows and columns of equally-sized data fields.

13. The method of claim 12, wherein the selected terrain data blocks are formed of an equal number of columns and rows of the data fields.

14. A method for progressive mesh storage, comprising the steps of:

reading original raster height field data as a first regular grid of contiguous rows and columns;

processing the raster height field data with a discrete wavelet transform to generate wavelet-encoded height fields;

selecting terrain data blocks from the processed raster height field data at a power-of-two level of detail; and reconstructing the selected terrain data blocks into second regular grid that matches the first grid identically, or by a reduced power-of-two for corresponding rows and columns.

* * * * *

UNITED STATES PATENT AND TRADEMARK OFFICE
CERTIFICATE OF CORRECTION

PATENT NO. : 7,680,350 B2 Page 1 of 1
APPLICATION NO. : 11/124793
DATED : March 16, 2010
INVENTOR(S) : Gregory A. Baxes It is certified that error appears in the above-identified patent and that said Letters Patent is hereby corrected as shown below:

Column 12, line 10, "changes a" should read --changes α--; line 19, "After a" should read --After α--; line 21 "by a" should read --by α--;

Signed and Sealed this

Fifteenth Day of June, 2010

David J. Kappos
*Director of the United States Patent and Trademark Office*